US009030942B2

(12) United States Patent
Kim et al.

(10) Patent No.: US 9,030,942 B2
(45) Date of Patent: May 12, 2015

(54) METHOD AND APPARATUS FOR TRANSMITTING AND RECEIVING DATA USING CONTENTION-BASED ACCESS IN MOBILE COMMUNICATION SYSTEM

(75) Inventors: Sang-Bum Kim, Seoul (KR); Soeng-Hun Kim, Suwon-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 13/521,160

(22) PCT Filed: Jan. 11, 2011

(86) PCT No.: PCT/KR2011/000178
§ 371 (c)(1),
(2), (4) Date: Jul. 9, 2012

(87) PCT Pub. No.: WO2011/084034
PCT Pub. Date: Jul. 14, 2011

(65) Prior Publication Data
US 2012/0320760 A1     Dec. 20, 2012

(30) Foreign Application Priority Data

Jan. 11, 2010  (KR) ......................... 10-2010-0002408

(51) Int. Cl.
*H04W 74/08* (2009.01)
*H04L 1/18* (2006.01)

(52) U.S. Cl.
CPC ............. *H04W 74/08* (2013.01); *H04L 1/1812* (2013.01)

(58) Field of Classification Search
None
See application file for complete search history.

(56) References Cited

U.S. PATENT DOCUMENTS

| 2003/0060224 | A1* | 3/2003 | Nelson et al. ................. 455/522 |
| 2005/0180328 | A1* | 8/2005 | Kim et al. ..................... 370/236 |
| 2006/0092960 | A1* | 5/2006 | Lee et al. ...................... 370/412 |
| 2008/0002734 | A1* | 1/2008 | Zheng et al. .................. 370/445 |
| 2009/0290490 | A1  | 11/2009 | Welsh |

FOREIGN PATENT DOCUMENTS

| EP | 1 009 184 A2 | 6/2000 |
| KR | 10-0565712 B1 | 9/2006 |
| KR | 10-2008-0099331 A | 11/2008 |
| WO | 2007/089797 A2 | 8/2007 |

* cited by examiner

*Primary Examiner* — Huy D Vu
*Assistant Examiner* — James P Duffy
(74) *Attorney, Agent, or Firm* — Jefferson IP Law, LLP

(57) ABSTRACT

A method and apparatus is provided for transmitting and receiving data using a Contention-Based (CB) access to prevent successive collisions due to an HARQ operation and improve the probability of successful reception in a mobile communication system. In a method for transmitting data using a CB access, it is determined whether it is possible to transmit data provided from an upper layer to a Node B using a CB access method. If it is possible to transmit the data using the CB access method, a CB grant is acquired from the Node B. Upon acquiring the CB grant, a transmit power is determined by selecting a smaller value among a value obtained by adding a predetermined first margin value to an uplink power Required_uplink_power required to transmit the data, and a maximum transmit power of a UE.

6 Claims, 6 Drawing Sheets

US 9,030,942 B2

METHOD AND APPARATUS FOR TRANSMITTING AND RECEIVING DATA USING CONTENTION-BASED ACCESS IN MOBILE COMMUNICATION SYSTEM

PRIORITY

This application is a National Stage application under 35 U.S.C. §371 of an International Application filed on Jan. 11, 2011, and assigned application No. PCT/KR2011/000178, and claims the benefit under 35 U.S.C. §365(b) of a Korean patent application filed in the Korean Industrial Property Office on Jan. 11, 2010, and assigned Serial No. 10-2010-0002408, the entire disclosures of each of which is incorporated herein by reference.

TECHNICAL FIELD

The present invention relates generally to a method and apparatus for transmitting and receiving data in a mobile communication system, and more particularly, to a method and apparatus for transmitting and receiving data using a Contention-Based (CB) access in a mobile communication system.

BACKGROUND ART

The 3rd Generation Partnership Project (3GPP) Long Term Evolution-Advanced (LTE-A), which is the next-generation mobile communication system, is under standardization, and its standardization is expected to be completed by 2011. To provide better performance than the existing high-speed packet-based communication, several schemes are under discussion in LTE-A. Among them, typical schemes include a Carrier Aggregation (CA) technology of transmitting data using several frequency bands altogether, and a Minimization of Drive Test (MDT) scheme in which a User Equipment (UE) stores its receiving performance in shadow areas, allowing a Node B to use the stored information later in optimizing service coverage.

For the LTE-A system, many discussions have been made on a CB access method to reduce the time from Service Request (SR) to resource allocation. The existing access process includes an SR trigger process, an access process, and a resource allocation process, i.e., a grant process. The term 'grant' refers to informing a UE of the wireless resources that the UE is granted to transmit data on an uplink. If data to be transmitted is generated in a specific UE, the UE first triggers an SR. If the SR is triggered, the UE attempts an access to send a service request to a Node B over a Physical Uplink Control Channel (PUCCH). If there is no PUCCH to be used to request a service, the UE attempts a random access process.

The random access process includes a total of 4 contention-based steps. Upon detecting a collision, a UE should re-perform the random access process from the beginning. Upon completion of the random access process, a Node B allocates resources that the UE will use. The allocated resources cannot be used by other UEs, for data transmission. In this conventional method, a UE requires many procedures and long time to be actually allocated resources.

The CB access method reduces the time required up to resource allocation by omitting the access process that is performed for exclusive resource allocation in the existing random access method. A Node B broadcasts a CB grant indicating available wireless resources. In this case, the available wireless resources can be used by any UEs in transmitting their data through contention.

Therefore, a UE determines the presence/absence of a grant broadcasted from a Node B, and if data to be transmitted is generated, the UE transmits the data using wireless resources indicated by the grant. In order for a UE to secure resources required for data transmission, this method does not include an access process and a process of assigning exclusive grants to other UEs, thereby reducing the time from SR triggering to data transmission, compared with the random access process.

The CB access method may reduce the time up to data transmission, but increases in inefficiency due to the CB disadvantageously. For example, if a plurality of UEs are assigned the same grant to transmit data, a collision occurs. In this situation, no UEs can use the associated resources. Therefore, an increase in the number of UEs desiring to use a CB grant causes a reduction in the efficiency thereof. As another problem, successive collisions may occur due to a Hybrid Automatic Repeat request (HARQ) operation. HARQ is a method in which if a receiving error for a packet occurs in a reception side, a transmission side is allowed to retransmit the packet. If a receiving error occurs, a Node B reallocates wireless resources to a UE several frames after the error occurrence so that the UE may retransmit the packet.

DISCLOSURE OF INVENTION

Technical Problem

In the current mobile communication system, if a Node B cannot correctly determine the cause of a data reception error even when a collision occurs during data transmission through a CB grant, the Node B performs an HARQ operation, determining the data reception error as not a collision, but a simple packet reception error. In this case, because the Node B reallocates resources in the same frequency location after several frames, the data retransmitted by a plurality of UEs that have collided with each other, may collide again. Therefore, there is a demand for a scheme capable of solving this successive collision problem.

Solution to Problem

An aspect of the present invention is to address at least the above-mentioned problems and/or disadvantages and to provide at least the advantages described below. Accordingly, an aspect of exemplary embodiments of the present invention is to provide a method and apparatus for transmitting and receiving data using a CB access in a mobile communication system.

Another aspect of exemplary embodiments of the present invention is to provide a method and apparatus for preventing successive collisions due to an HARQ operation and improving the probability of successful reception when transmitting and receiving data using a CB access in a mobile communication system.

In accordance with one aspect of the present invention, there is provided a method for transmitting data using a Contention-Based (CB) access in a mobile communication system. The method includes determining whether it is possible to transmit data provided from an upper layer to a Node B using a CB access method; if it is possible to transmit the data using the CB access method, acquiring a CB grant from the Node B; upon acquiring the CB grant, determining, as a transmit power, a smaller value among a value obtained by adding a predetermined first margin value to an uplink power Required_uplink_power required to transmit the data, and a maximum transmit power of a User Equipment (UE); and transmitting the data through a resource indicated by the CB grant with the determined transmit power.

In accordance with another aspect of the present invention, there is provided a method for receiving data using a Contention-Based (CB) access in a mobile communication system. The method includes determining whether there are CB resources available to perform a CB access procedure; if there are available CB resources, broadcasting a CB grant and receiving data through a wireless resource designated by the CB grant; determining whether it is possible to detect a collision for the data; if it is possible to detect a collision for the data, checking whether the collision is detected; and upon detecting the collision, sending an Acknowledge (ACK) message to a User Equipment (UE).

In accordance with further another aspect of the present invention, there is provided an apparatus for transmitting data using a Contention-Based (CB) access in a mobile communication system. The apparatus includes a Hybrid Automatic Repeat request (HARQ) buffer for storing data provided from an upper layer; and an analyzer for determining whether it is possible to transmit data stored in the HARQ buffer to a Node B using a CB access method; if it is possible to transmit the data using the CB access method, acquiring a CB grant from the Node B through a transceiver; determining, as a transmit power, a smaller value among a value obtained by adding a predetermined first margin value to an uplink power Required_uplink_power required to transmit the data, and a maximum transmit power value of a User Equipment (UE); and controlling the transceiver to transmit the data through a resource indicated by the CB grant with the determined transmit power.

In accordance with yet another aspect of the present invention, there is provided an apparatus for receiving data using a Contention-Based (CB) access in a mobile communication system. The apparatus includes a transceiver; and an analyzer for determining whether there are CB resources available to perform a CB access procedure; if there are available CB resources, broadcasting a CB grant and controlling the transceiver to receive data through a wireless resource designated by the CB grant; determining whether it is possible to detect a collision for the data; if it is possible to detect the collision, checking whether the collision is detected; and upon detecting the collision, sending an Acknowledge (ACK) message to a User Equipment (UE).

Advantageous Effects of Invention

According to the present invention, when UEs transmit data using a CB access scheme, it is highly likely that a Node B can successfully receive data from at least one of the UEs.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

MODE FOR THE INVENTION

Figure 1A:
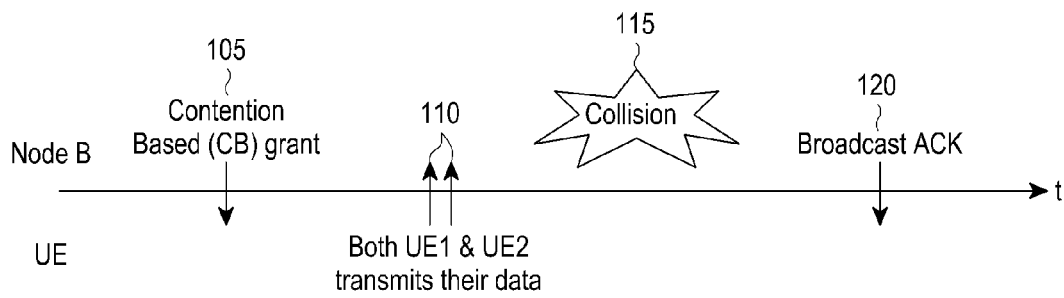
FIGS. 1A to 1D are diagrams illustrating examples of an HARQ operation in a CB access method to which the present invention is applied.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The below-described specification provides an HARQ operation for preventing collisions from successively occurring, and a method improving the probability of successful reception when transmitting data using a CB access.

To prevent successive collisions due to an HARQ operation, a Node B should be able to determine the cause of a reception error. If the cause of a reception error is determined as a collision, unwanted successive collisions may be avoided by not permitting HARQ retransmission. Actually, however, it is not easy for a Node B to correctly determine the cause of a reception error. Therefore, if the cause of a reception error is unclear, the Node B should prevent successive collisions by sending a Not-Acknowledge (NACK) message. Besides, a UE is required to be designed to transmit signals using a scheme other than the conventional scheme, or to enable robust transmission/reception even without an HARQ operation.

In the present invention, an embodiment using HARQ is defined as a first embodiment, while an embodiment not using HARQ is defined as a second embodiment.

First Embodiment

As described above, to enable an HARQ operation in a CB access, upon failure in decoding, a Node B should determine whether the failure is caused by a collision or by a general transmission loss on a wireless channel, and sends an ACK/NACK message in reply to uplink transmission. It is not easy for the Node B to correctly determine the presence/absence of a collision. However, the Node B may estimate collisions to some extent by deriving a correlation value between reference signals transmitted by UEs.

Assume that a Node B can correctly determine the presence/absence of a collision. In the case of a collision, the Node B stops transmission by sending an HARQ ACK message to UEs, and otherwise, the Node B instructs retransmission by sending an HARQ NACK message. In addition, if a collision occurs, it is important to increase the probability of successfully decoding data transmitted from at least one UE.

If a collision occurs among several uplink transmission data, it is preferable for a Node B to decode uplink transmission data having the maximum transmit power among the collided uplink transmission data, if possible. Therefore, it is preferable that a plurality of UEs are different in transmit power, and any one of the UEs transmits signals with the maximum transmit power. In performing initial HARQ transmission depending on a CB grant, a UE calculates uplink transmit power using Equation (1) below.

$$P_{CB\_PUSCH}(i)=\min[P_{CMAX}, \text{Required\_uplink\_power}+\text{margin}_{CB}] \quad (1)$$

In Equation (1), $P_{CB\_PUSCH}(i)$ denotes a transmit power of a Physical Uplink Shared Channel (PUSCH) over which data is to be transmitted in a CB access method for an i-th subframe, $P_{CMAX}$ denotes a maximum transmit power of a UE, and Required_uplink_power denotes an uplink power required to transmit the data over an uplink, and is subject to change according to a measured channel state. In addition, $\text{margin}_{CB}$ denotes a value added to Required_uplink_power to set the $P_{CB\_PUSCH}(i)$ for each UE differently or differentially in order to prevent a collision which may occur when a UE transmits data using the CB access method according to an embodiment of the present invention. In this specification, $\text{margin}_{CB}$ will be referred to as a CB margin value. Further, min[A, B] is a function of selecting one of A and B, which is smaller than the other one.

In Equation (1), $\text{margin}_{CB}$ is any one value in a margin value set that a UE receives from a Node B in a call setup process. The UE randomly selects any one value from the margin value set, and adds the selected margin value to Required_uplink_power. The margin value set may be stored in the UE in advance, instead of being received from the Node B.

If it is assume that there are two UEs that transmit data to a Node B using a CB access method, the two UEs may have a first margin value and a second margin value (assuming that the first margin value is greater than the second margin value) as different CB margin values $\text{margin}_{CB}$ according to a first embodiment of the present invention. In this case, if a collision occurs between a UE transmitting data using the first margin value and a UE transmitting data using the second margin value, a Node B will most likely decode the data transmitted by the UE using the first margin value. On the other hand, if no collision occurs, a reception success rate may be increased through a normal HARQ process. However, if one UE transmits data and decoding thereof is failed, the Node B sends a retransmission request to UEs. During retransmission, the margin value $\text{margin}_{CB}$ added during initial transmission according to Equation (1) is removed. In addition, transmit power is readjusted in accordance with Equation (2) below so as to meet a normal target Block Error Rate (BLER).

$$P_{CB\_PUSCH}(i)=\min[P_{CMAX}, \text{Required\_uplink\_power}] \quad (2)$$

That is, in Equation (2), if a retransmission request is received from a Node B due to fail in initial transmission, transmit power is set as a value obtained by removing the $\text{margin}_{CB}$ that was added to Required_uplink_power according to Equation (1).

In Equation (2), $P_{CB\_PUSCH}(i)$ denotes a transmit power of a PUSCH over which data is to be transmitted in a CB access method for an i-th subframe, $P_{CMAX}$ denotes a maximum transmit power of a UE, and Required_uplink_power denotes an uplink power required to transmit the data over an uplink, and is subject to change according to a measured channel state. In addition, min[A, B] is a function of selecting a smaller one of A and B.

If a NACK message is received from a Node B, indicting a fail in data transmission to the Node B, a normal HARQ operation should be performed to recover the HARQ operation distorted due to the margin value $\text{margin}_{CB}$ that was added to Required_uplink_power during initial transmission as in Equation (1), according to an embodiment of the present invention. Therefore, during first retransmission according to the normal HARQ operation, transmit power is determined by subtracting the margin value $\text{margin}_{CB}$ that was added to Required_uplink_power in accordance with Equation (1), as in Equation (3). From the next retransmission time on, transmit power may be determined using Equation (2) above. A margin value used in Equation (3) is the same as the CB margin value used in Equation (1).

$$P_{CB\_PUSCH}(i)=\min[P_{CMAX}, \text{Required\_uplink\_power}-\text{margin}_{CB}] \quad (3)$$

In Equation (3), $P_{CB\_PUSCH}(i)$ denotes a transmit power of a PUSCH over which data is to be transmitted in a CB access method for an i-th subframe, $P_{CMAX}$ denotes a maximum transmit power of a UE, and Required_uplink_power denotes an uplink power required to transmit the data over an uplink, and is subject to change according to a measured channel state. In addition, $\text{margin}_{CB}$ denotes a value added to Required_uplink_power to set the $P_{CB\_PUSCH}(i)$ for each UE differently or differentially in order to prevent a collision which may occur when a UE transmits data using the CB access method according to an embodiment of the present invention, and will be referred to as a CB margin value. In Equation (3), min[A, B] is a function of selecting one of A and B, which is smaller than the other one.

In accordance with an embodiment of the present invention, when a Node B cannot exactly determine the presence/absence of a collision, the Node B unconditionally broadcasts an ACK message regarding the wireless resources used by a UE to transmit data, thereby preventing the possible successive collisions.

FIGS. 1A to 1D illustrate examples of an HARQ operation in a CB access method to which the present invention is applied. It is assumed in FIGS. 1A to 1D that a Node B can correctly determine the presence/absence of a collision according to the first embodiment of the present invention.

Reference numeral 102 shows that a Node B has detected a collision of data received from two UEs (UE1 and UE2) (FIG. 1A). The UE1 and UE2 receive a CB grant broadcasted by the Node B at a time 105, and transmit their data in the same wireless resource location at a time 110. Upon detecting the collision (at a time 115), the Node B broadcasts an ACK message at a time 120 so that the two UEs may not retransmit the data.

Figure 1B:
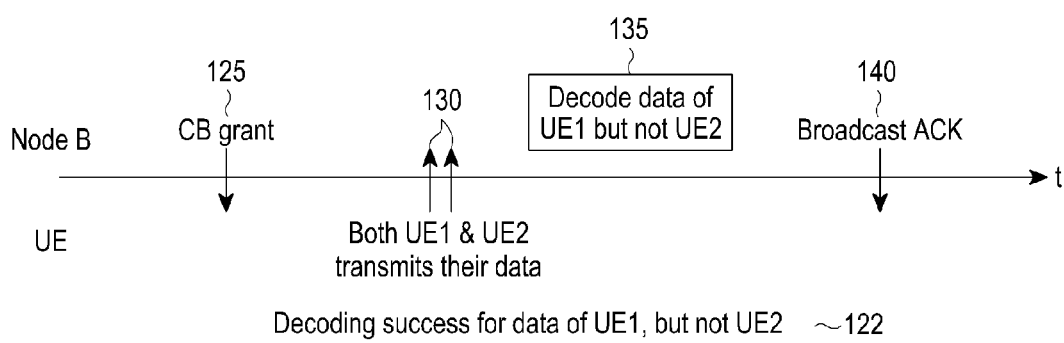

Reference numeral 122 shows that a Node B has succeeded in decoding only the data from one UE (UE1) from among the data received from two UEs (UE1 and UE2) (FIG. 1B). The UE1 and UE2 receive a CB grant broadcasted from the Node B at a time 125, and transmit their data in the same wireless resource location at a time 130. The Node B succeeds in decoding only the data from the UE1 at a time 135. The Node B broadcasts an ACK message at a time 140 so that the UEs may not retransmit the data.

Figure 1C:
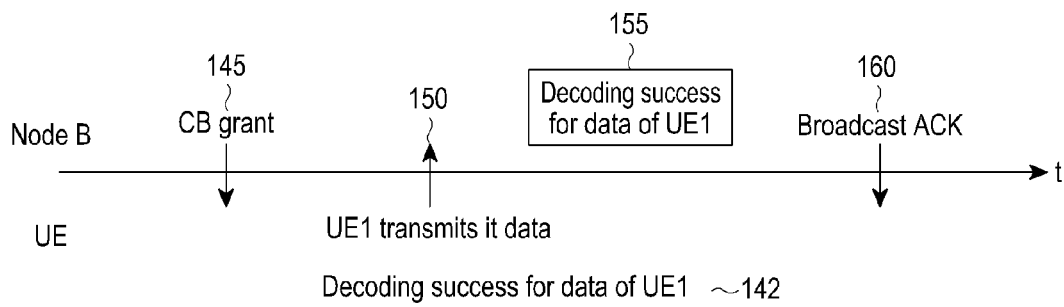

Reference numeral 142 shows that only one UE (UE1) transmits its data at a time 150 and a Node B succeeds in decoding the data at a time 155 (FIG. 1C). The Node B broadcasts an ACK message according to a normal HARQ operation at a time 160.

Figure 1D:
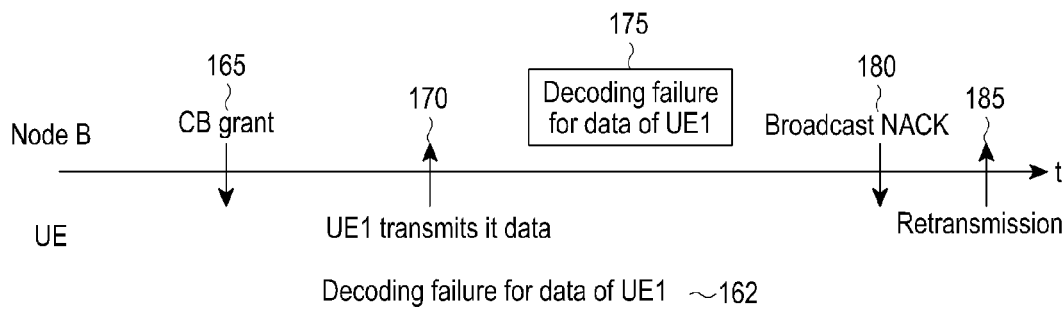

Reference numeral 162 shows that only one UE (UE1) transmits its data to a Node B at a time 170 and the Node B fails in decoding the data at a time 175 (FIG. 1D). The Node B broadcasts a NACK message according to a normal HARQ operation at a time 180, and upon receiving the NACK message, the UE attempts retransmission at a time 185.

Figure 2:
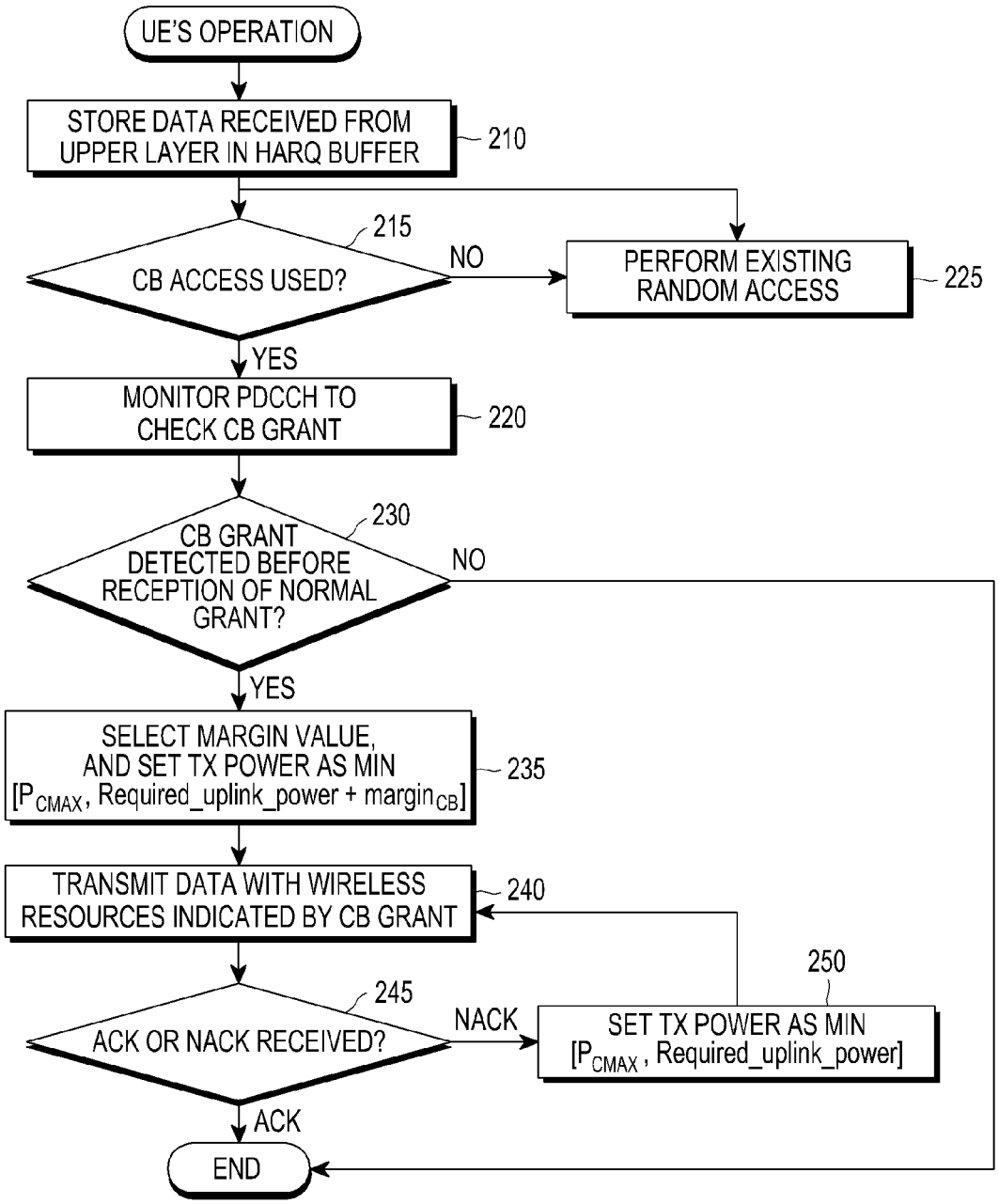
FIG. 2 is a flowchart illustrating an operation of a UE according to a first embodiment of the present invention.

FIG. 2 illustrates an operation of a UE according to a first embodiment of the present invention.

In step 210, a UE stores data received from an upper layer in an HARQ buffer. In step 215, the UE determines whether to transmit the data using a CB access method considering urgency of the data. Separately, the UE performs the existing random access method at the same time in step 225. If the UE determines to use the CB access method in step 215, the UE monitors in step 220 a Packet Data Control Channel (PDCCH), a channel on which a CB grant is delivered, to check whether a CB grant is broadcasted from a Node B.

If the UE has acquired a CB grant before receiving a grant based on the existing access method in step 230, the UE determines one margin value in a known margin value set and determines a transmit power in accordance with Equation (1) in step 235. A set of margin values according to an embodiment of the present invention may be acquired from a Node B as system information, or may be determined by the UE by itself. If the transmit power is determined in step 235, the UE transmits data in the wireless resource location indicated by the CB grant with the determined transmit power in step 240.

After transmitting the data in step 240, the UE checks in step 245 whether an ACK or NACK message is received from the Node B. Upon receiving an ACK message in step 245, the UE ends the CB access method. On the contrary, upon receiving a NACK message in step 245, the UE determines a transmit power in accordance with Equation (2) by removing the CB margin value used in step 235 to determine the transmit power, and attempts retransmission with the determined transmit power in step 250. Otherwise, for the first retransmission, the UE determines a transmit power by subtracting the margin value, which was added to Required_uplink_power to determine the transmit power during initial transmission, in accordance with Equation (3), and for the next retransmission, the UE determines a transmit power with only Required_uplink_power, to which no margin value is added, in accordance with Equation (2).

Figure 3:
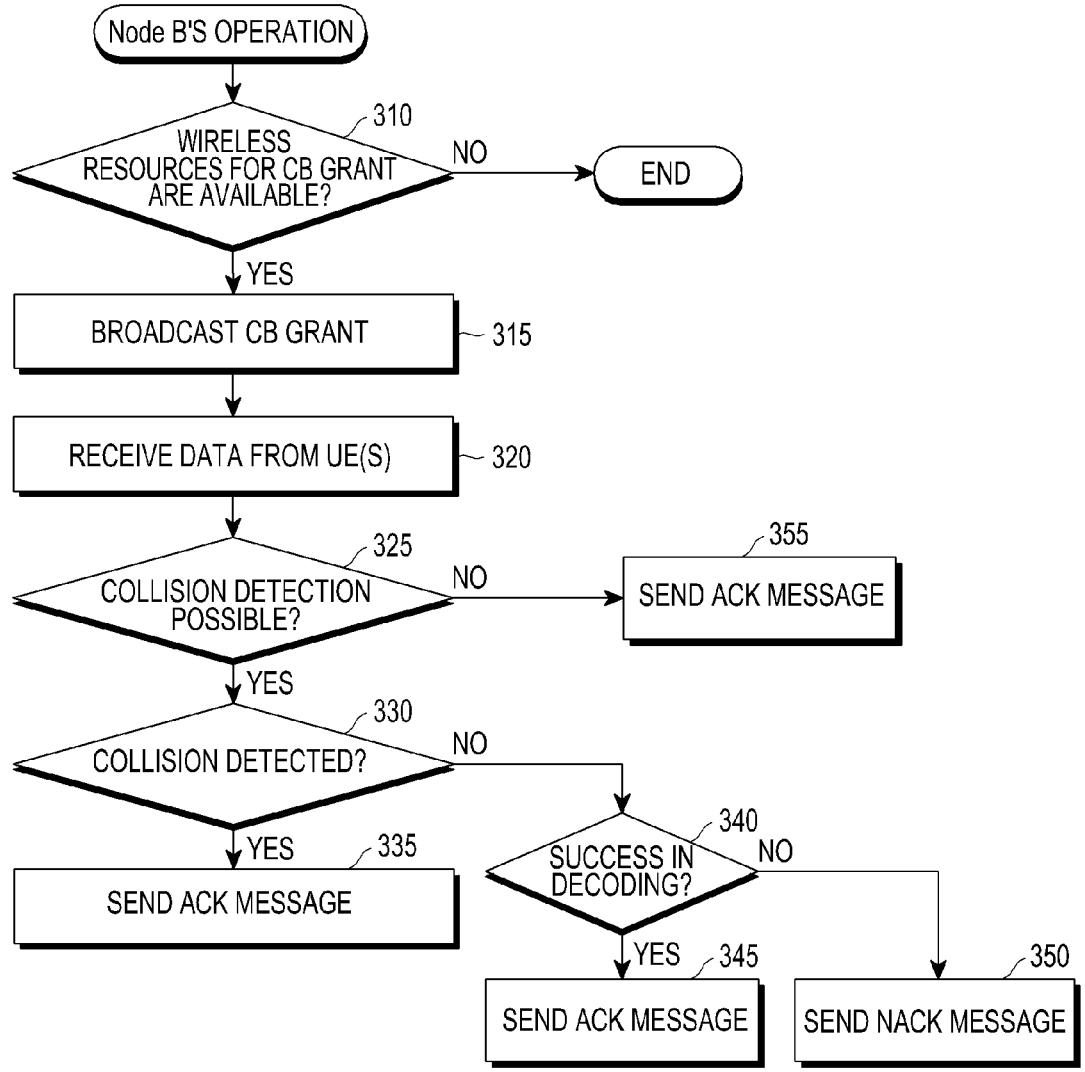
FIG. 3 is a flowchart illustrating an operation of a Node B according to the first embodiment of the present invention.

FIG. 3 illustrates an operation of a Node B according to the first embodiment of the present invention.

In step 310, a Node B determines whether there are wireless resources available for a CB access method, i.e., whether there are wireless resources for a CB grant. If there are available resources in step 310, the Node B broadcasts a CB grant for the resources in step 315. In step 320, one or a plurality of UEs transmit data in the wireless resource location designated by the CB grant, and the Node B receives the data.

In step 325, the Node B determines whether it can exactly determine the presence/absence of a collision regarding the data reception. The Node B can judge whether it can determine the presence/absence of a collision, considering a characteristic of the received data.

If determining the presence/absence of a collision is possible in step 325, the Node B determines the presence/absence of a collision in step 330. Upon detecting a collision in step 330, the Node B sends an ACK message in step 335. However, upon failure to detect a collision in step 330, the Node B determines in step 340 whether it has succeeded in decoding as in the existing HARQ operation.

In case of a success in decoding in step 340, the Node B sends an ACK message in step 345, and in case of a failure in decoding, the Node B sends a NACK message in step 350.

On the other hand, if it is difficult to determine the presence/absence of a collision in step 325, the Node B unconditionally sends an ACK message in step 355, in order to prevent successive collisions which may possibly occur as UEs retransmit the data using a CB access method due to a failure to receive an ACK message.

Figure 4:
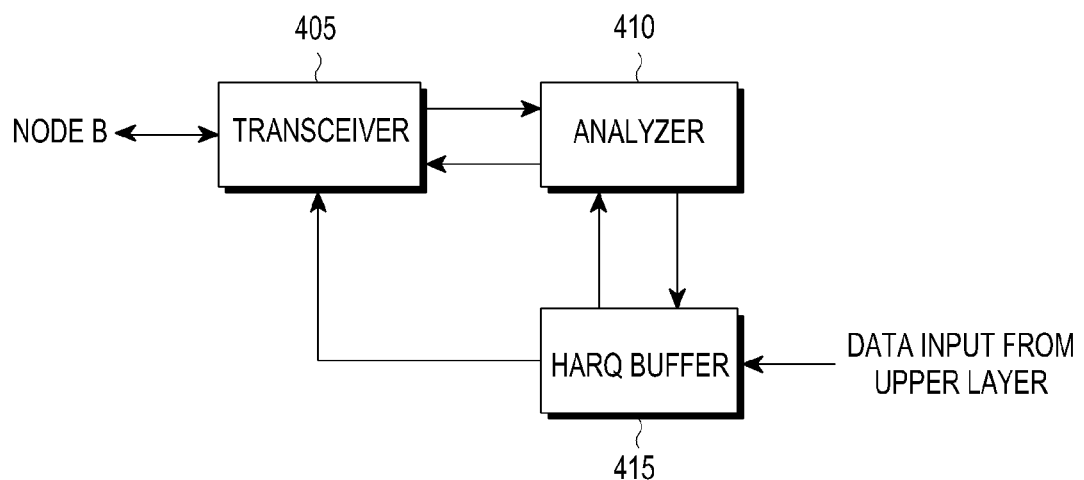
FIG. 4 is a block diagram of a UE according to the first embodiment of the present invention.

FIG. 4 is a block diagram of a UE according to the first embodiment of the present invention.

A transceiver 405 takes charge of monitoring a CB grant and an ACK/NACK message broadcasted from a Node B, and transmitting/receiving data. An analyzer 410 determines whether to transmit data stored in an HARQ buffer 415 depending on a CB grant. The analyzer 410 also determines whether to retransmit data based on an ACK/NACK message. The HARQ buffer 415 stores data to be transmitted, and delivers data to be transmitted or retransmitted to the transceiver 405 under an instruction from the analyzer 410.

That is, the HARQ buffer 415 stores data received from an upper layer. The analyzer 410 determines whether it can transmit the data stored in the HARQ buffer 415 to the Node B using the CB access method. If it is possible to transmit the data using the CB access method, the analyzer 410 acquires a CB grant from the Node B through the transceiver 405. After that, the analyzer 410 determines, as a transmit power, a smaller value among a value obtained by adding a predetermined first margin value to an uplink power Required_uplink_power required to transmit the data, and a maximum transmit power of the UE, and controls the transceiver 405 to transmit the data through a resource indicated by the CB grant with the determined transmit power. The transmit power may be determined using any one of Equations (1) to (3).

Figure 5:
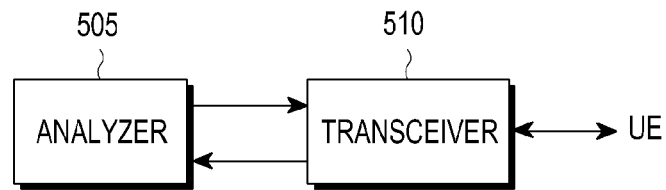
FIG. 5 is a block diagram of a Node B according to the first embodiment of the present invention.

FIG. 5 is a block diagram of a Node B according to the first embodiment of the present invention. An analyzer 505 determines whether there are available resources for a CB access. The analyzer 505 also determines whether to send an ACK or NACK message, considering the presence/absence of a collision of received data. A transceiver 510 broadcasts a CB grant, and sends an ACK or NACK message under an instruction from the analyzer 505.

In other words, the analyzer 505 according to the first embodiment of the present invention determines whether there are CB resources available to perform a CB access procedure. If there are available CB resources, the analyzer 505 broadcasts a CB grant through the transceiver 510, and controls the transceiver 510 to receive data through a wireless resource designated by the CB grant. The analyzer 505 determines whether it can detect occurrence/non-occurrence of a collision of the data, and if detecting a collision is possible, the analyzer 505 checks whether a collision is detected. Upon detecting a collision, the analyzer 505 controls the transceiver 510 to send an ACK message to the UE.

Second Embodiment

In a second embodiment of the present invention, a CB access does not use HARQ.

In order to operate HARQ according to the first embodiment of the present invention, the presence/absence of a collision should be exactly determined. If it is difficult to determine the presence/absence of a collision, HARQ may never operate according to the first embodiment in reality. In this case, therefore, it could be more efficient not to use HARQ. To compensate an HARQ gain, an uplink transmit power is determined by adding a predetermined offset value $P_{O\_CB\_PUSCH}$ to Required_uplink_power in accordance with Equation (4).

$$P_{CB\_PUSCH}(i) = \min [P_{CMAX}, 10 \log_{10}(M_{PUSCH}(i)) + P_{O\_PUSCH}(j) + \alpha(j) \cdot PL + \Delta_{TF}(i) + f(i) + P_{O\_CB\_PUSCH}] \quad (4)$$

In Equation (4), $10 \log_{10}(M_{PUSCH}(i)) + P_{O\_PUSCH}(j) + \alpha(j) \cdot PL + \Delta_{TF}(i) + f(i)$ corresponds to Required_uplink_power used in Equations (1) to (3). $P_{CB\_PUSCH}(i)$ represents a transmit power of a PUSCH over which data is to be transmitted in a CB access method for an i-th subframe, and is defined by several parameters. $P_{CMAX}$ represents a maximum transmit power of a UE. $10 \log_{10}(M_{PUSCH})$ is a frequency band allocated to a PUSCH for an i-th subframe. $P_{O\_PUSCH}(j)$ is a PUSCH-related offset value, where j is a value determined according to a specific grant situation such as a semi-persistent grant, a dynamic scheduled grant, and a random access response grant. $\alpha(j)$ is a cell-specific variable, and PL is a downlink path loss. $\Delta_{TF}(i)$ is a UE-specific variable, and $f(i)$ is a value determined according to the current application of PUSCH power control. $P_{O\_CB\_PUSCH}$ is a margin value added for data transmission by a CB access. For more details of the remaining parameters except for $P_{O\_CB\_PUSCH}$, reference can be made to the 3GPP TS36.213 standard documents. In the second embodiment of the present invention, if '$10 \log_{10}(M_{PUSCH}(i))+P_{O\_PUSCH}(j)+\alpha(j) \cdot PL+\Delta_{TF}(i)+f(i)+P_{O\_PUSCH}$' is greater than $P_{CMAX}$ as a result of the min[ ] function in Equation (4), a UE may always use $P_{CMAX}$ during a CB access.

Figure 6:
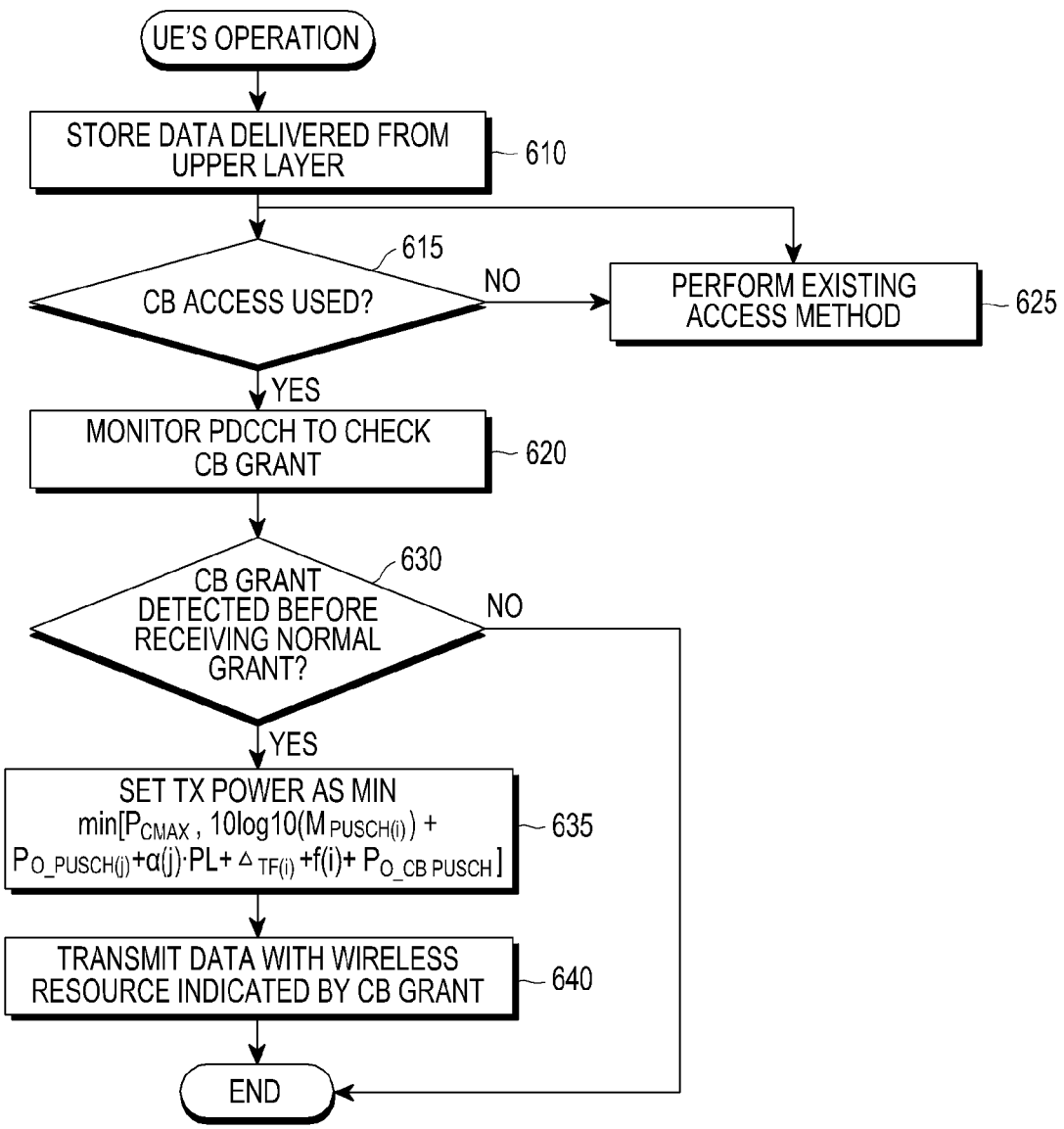
FIG. 6 is a flowchart illustrating an operation of a UE according to a second embodiment of the present invention.

FIG. 6 illustrates an operation of a UE according to the second embodiment of the present invention.

In step 610, a UE stores data delivered from an upper layer in an HARQ buffer. In step 615, the UE determines whether to transmit the data using a CB access method. Separately, the UE performs the existing access method at the same time in step 625. If the UE determines to use the CB access method in step 615, the UE monitors in step 620 a PDCCH, a channel over which a CB grant is delivered, to check whether a CB grant is broadcasted from a Node B.

While monitoring a PDCCH in step 620, if the UE has acquired a CB grant before receiving a grant based on the existing access method in step 630, the UE determines a transmit power by adding a predetermined offset value in accordance with Equation (4) in step 635. If '

'$10 \log_{10}(M_{PUSCH}(i))+P_{O\_PUSCH}(j)+\alpha(j) \cdot PL+\Delta_{TF}(i)+f(i)+P_{O\_CB\_PUSCH}$' is greater than $P_{CMAX}$ in step 635, the UE may use $P_{CMAX}$ as a transmit power. After determining the transmit power in step 635, the UE transmits data in the wireless resource location indicated by the CB grant with the determined transmit power in step 640. Since the second embodiment of the present invention does not perform an HARQ operation, the CB access process is ended right after the data transmission.

Figure 7:
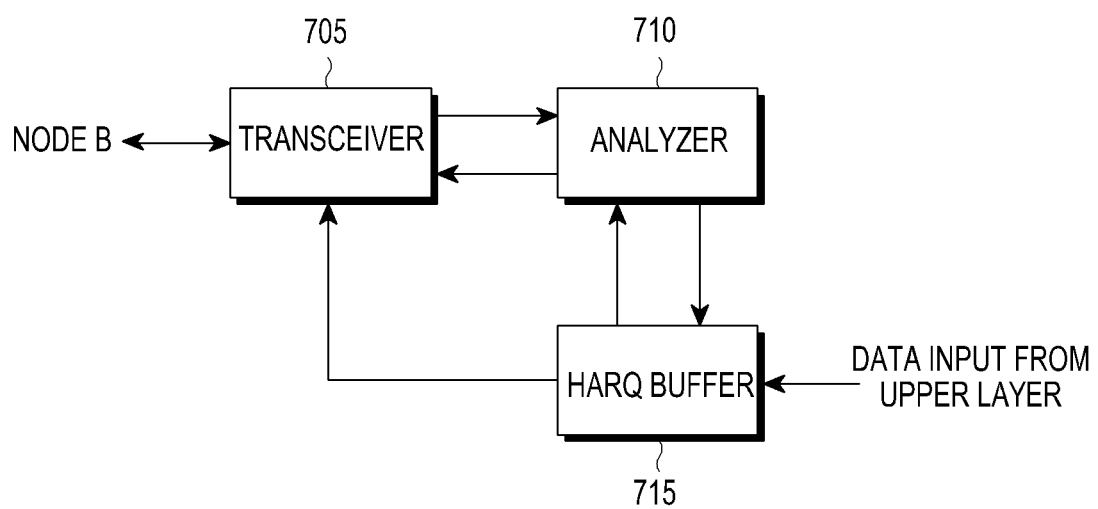
FIG. 7 is a block diagram of a UE according to the second embodiment of the present invention.

FIG. 7 is a block diagram of a UE according to the second embodiment of the present invention. A transceiver 705 takes charge of monitoring a CB grant broadcasted from a Node B, and transmitting/receiving data. An analyzer 710 determines whether to transmit data stored in an HARQ buffer 715 depending on a CB grant. The analyzer 710 determines a transmit power by reflecting a predetermined offset value. The HARQ buffer 715 stores data to be transmitted, and delivers the data to be transmitted to the transceiver 705 under an instruction from the analyzer 710.

In the second embodiment of the present invention, since an HARQ operation is not performed, a special operation of a Node B according to the second embodiment of the present invention is not required.

As described above, embodiments of the present invention provide a method and apparatus for preventing successive collisions due to an HARQ operation and improving the probability of successful reception when at least two UEs transmit data to a Node B using a CB access in a mobile communication system. As a result, first and second UEs set different transmit powers for data transmission so that the Node B may receive data from at least one of the two UEs.

The above-described method of the present invention may be realized in a program and stored in a computer readable recording medium (for example, CD-ROM, RAM, floppy disks, hard disks, magneto-optical disks, flash memory, etc.). This process may be easily carried out by those skilled in the art, so a detailed description thereof will be omitted.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for transmitting data using a Contention-Based (CB) access in a mobile communication system, the method comprising:
    determining whether it is possible to transmit data provided from an upper layer to a Node B using a CB access method;
    if it is possible to transmit the data using the CB access method, acquiring a CB grant from the Node B;
    upon acquiring the CB grant, determining, prior to transmission, as a transmit power, a smaller value among a value obtained by adding a predetermined first margin value to an uplink power required to transmit the data, and a maximum transmit power of a User Equipment (UE); and
    transmitting the data through a resource indicated by the CB grant with the determined transmit power, wherein the first margin value comprises a CB margin value assigned differently or differentially to each UE and added to the uplink power to set the transmit power for each UE differently or differentially in order to prevent a collision which may occur when the UE transmits data using the CB access method.

2. The method of claim 1, further comprising, upon receiving a Not-Acknowledge (NACK) message from the Node B after transmitting the data, re-setting the transmit power as a smaller value among the uplink power and the maximum transmit power and retransmitting the data with the re-set transmit power.

3. The method of claim 1, further comprising, upon receiving a NACK message from the Node B after transmitting the data, re-setting the transmit power as a smaller value among a value obtained by subtracting the first margin value to the uplink power and the maximum transmit power.

4. An apparatus for transmitting data using a Contention-Based (CB) access in a mobile communication system, the apparatus comprising:
    a Hybrid Automatic Repeat request (HARQ) buffer for storing data provided from an upper layer;
    and an analyzer for,
        determining whether it is possible to transmit data stored in the HARQ buffer to a Node B using a CB access method;
        if it is possible to transmit the data using the CB access method, acquiring a CB grant from the Node B through a transceiver;
        determining, prior to transmission, as a transmit power, a smaller value among a value obtained by adding a predetermined first margin value to an uplink power required to transmit the data, and a maximum transmit power value of a User Equipment (UE); and
        controlling the transceiver to transmit the data through a resource indicated by the CB grant with the determined transmit power, wherein the first margin value comprises a CB margin value assigned differently or differentially to each UE and added to the uplink power to set the transmit power for each UE differently or differentially in order to prevent a collision which may occur when the UE transmits data using the CB access method.

5. The apparatus of claim 4, wherein upon receiving a Not-Acknowledge (NACK) message from the Node B after transmitting the data, the analyzer re-sets the transmit power as a smaller value among the uplink power and the maximum transmit power.

6. The apparatus of claim 4, wherein upon receiving a NACK message from the Node B after transmitting the data, the analyzer re-sets the transmit power as a smaller value among a value obtained by subtracting the first margin value to the uplink power and the maximum transmit power.

* * * * *